United States Patent
Hesampour et al.

(10) Patent No.: US 12,202,756 B2
(45) Date of Patent: *Jan. 21, 2025

(54) METHOD AND SYSTEM FOR CONTROLLING HYDROPHOBIC CONDITIONS AND FOULING IN WATER INTENSIVE PROCESSES

(71) Applicant: KEMIRA OYJ, Helsinki (FI)

(72) Inventors: Mehrdad Hesampour, Espoo (FI); Roderick Abinet, Bad Soden (DE); Marjatta Piironen, Oulu (FI); Eija Korte, Espoo (FI); Iiris Joensuu, Espoo (FI)

(73) Assignee: KEMIRA OYJ, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,492

(22) Filed: Dec. 4, 2023

(65) Prior Publication Data

US 2024/0092668 A1 Mar. 21, 2024

Related U.S. Application Data

(63) Continuation of application No. 16/339,920, filed as application No. PCT/FI2017/050708 on Oct. 6, 2017, now Pat. No. 11,866,356.

(30) Foreign Application Priority Data

Oct. 7, 2016 (FI) .................................... 20165758

(51) Int. Cl.
*B01D 65/08* (2006.01)
*B01D 65/02* (2006.01)
*C02F 1/24* (2023.01)
*C02F 1/28* (2023.01)
*C02F 1/44* (2023.01)
*C02F 1/52* (2023.01)
(Continued)

(52) U.S. Cl.
CPC ............... *C02F 9/00* (2013.01); *B01D 65/02* (2013.01); *B01D 65/08* (2013.01); *C02F 1/24* (2013.01); *C02F 1/281* (2013.01); *C02F 1/44* (2013.01); *C02F 1/5209* (2013.01); *C02F 2103/02* (2013.01); *C02F 2103/10* (2013.01); *C02F 2103/28* (2013.01); *C02F 2103/32* (2013.01); *C02F 2103/365* (2013.01); *C02F 2209/001* (2013.01); *C02F 2209/003* (2013.01); *C02F 2209/11* (2013.01)

(58) Field of Classification Search
CPC .............. C02F 1/5209; C02F 2209/001; C02F 2209/003; C02F 2209/11; B01D 65/08
See application file for complete search history.

(56) References Cited

U.S. PATENT DOCUMENTS

2016/0038885 A1* 2/2016 Hogen-Esch .......... B01D 65/08
210/500.33

* cited by examiner

Primary Examiner — Bradley R Spies
(74) Attorney, Agent, or Firm — Espatent Oy

(57) ABSTRACT

In a water treatment system, a pretreatment chemical is added to water stream in a pretreatment process including a coagulation, flocculation and separation to reduce amount of dissolved and/or particulate matter in the water stream. Hydrophobic conditions in the water stream are monitored upstream or downstream from adding the pretreatment chemicals. Dosing of the pretreatment chemical to the water stream is controlled based on the monitored hydrophobic conditions. Thereby a membrane fouling in subsequent membrane filtration stage can be minimized.

22 Claims, 5 Drawing Sheets

(51) Int. Cl.
    *C02F 9/00*         (2023.01)
    *C02F 103/02*     (2006.01)
    *C02F 103/10*     (2006.01)
    *C02F 103/28*     (2006.01)
    *C02F 103/32*     (2006.01)
    *C02F 103/36*     (2006.01)

METHOD AND SYSTEM FOR CONTROLLING HYDROPHOBIC CONDITIONS AND FOULING IN WATER INTENSIVE PROCESSES

FIELD OF THE INVENTION

The invention relates to water treatment systems, and more particularly to water treatment systems having a water pretreament process, prior to following water treatment step(s), in particular membrane filtration or reverse osmosis. Furthermore, the invention relates to water treatment system having a pretreatment process for decreasing or preventing fouling on the surfaces in a following process using water from the pretreatment process.

BACKGROUND OF THE INVENTION

The use of membrane technology, such as microfiltration (MF), ultrafiltration (UF), nanofiltration (NF), and reverse osmosis (RO), is becoming increasingly important in drinking water treatment and waste water treatment, whereby membrane technology is becoming increasingly important. The membranes provide a physical barrier that permits the passage of materials only up to a certain size, shape or character, and effectively removes solids, viruses, bacteria and other unwanted molecules. Membranes are manufactured in a variety of configurations including hollow fiber, spiral, and tubular shapes.

Waters, e.g. waste water and raw water, especially surface waters, contain impurities that can impact the operation of e.g. membrane processes. Organic compounds and mineral salts present in the water may form fouling on equipment surfaces, e.g. on membrane surface which may reduce the overall efficiency of the water treatment plant. Several types of fouling exist: including inorganic fouling or scaling, colloidal fouling, organic fouling, and biofouling. Therefore, water treatment processes, for example membrane processes may require a pretreatment step where the amount of organics and particle in feed water are reduced.

Waters, e.g. waste water and raw water, especially surface waters, contain impurities that can also cause fouling on the surfaces which are in touch with water, if not pretreated to reduce the amount of organic substances and particulate matter. Fouling typically may be a problem on surfaces of pipes, instruments, heat exchangers, in cooling water systems and in splash areas.

Coagulation is commonly used for a pretreatment step to remove most of organic and inorganics which cause fouling. To follow the coagulation performance there is a need for monitoring critical parameters to insure that pretreatment is sufficient and efficient. However, most often improper adjustment of coagulants (overdosing or too low dosing) and operating conditions reduce performance of coagulation. In order to reduce the impact of over/low dosing of coagulant(s), there is need to have a system to control dosing of coagulants and/or flocculants.

There have been various approaches to implement a control of dosing coagulants and/or flocculants. Streaming current detectors (SCD) work by immobilizing a charged particle and measuring the electric current produced as charged particles within the water flow, i.e., the streaming current. Water is drawn in from a sample point and difference in potential between the stationary and mobile components are detected with electrodes.

Another approach is the use of Zeta ($\zeta$) potential which provides a measurable value to monitor optimal water clarification capabilities. At a zeta potential near zero, a system is unstable and highly prone to aggregation. Monitoring the zeta potential of water treatment streams therefore tries to provide a way of maintaining optimal conditions for flocculation.

Still another approach is to adjust a coagulant addition based on pH.

Conventional systems appear to be inaccurate and do not give enough information for accurate control of chemical treatment. The water industry is keen to access on-line measurement and move towards automated, more accurate coagulant and/or flocculant control. Furthermore, more effective measures in selection and/or dosing of flocculants and/or coagulants in a water treatment process are wished.

US 2013078730 A1 discloses a method for detecting the presence and amounts of contaminants, such as oil and grease, in wastewater.

WO 2012111402 A discloses a pretreatment device performs a pretreatment for filtering solute-containing water to remove impurities.

JP 2007245078 A discloses a water treatment system having a flocculation process unit that adds and agglomerates a coagulant to natural water, and a membrane separation unit that filters the flocculation-treated water.

WO 2015075319 A1 discloses fragmentation of a sample into particle populations and determining the particle sizes and amounts of hydrophobic particles using fluorescence or absorbance measurement.

BRIEF DESCRIPTION OF THE INVENTION

An object of the invention is to provide a method to control water treatment in a way that overcomes at least partly the problems in current methods.

Another object of the invention is to provide a method to control water treatment process, in a way that fouling in the following water treatment steps, in particular in membrane filtration may be prevented or decreased.

Another object of the invention is to provide a method to control water treatment process, in a way that fouling is decreased or prevented on the process equipment surfaces in following process(es) using water from the pretreatment process. An aspect of the invention is a method of controlling a water treatment process, a control system, and use of a hydrophobicity monitoring unit in controlling of a water treatment process according to the attached independent claims. Embodiments of the invention are recited in the dependent claims.

An aspect of the invention is a method of controlling a water treatment process, comprising
  adding at least one pretreatment chemical to a water stream in a pretreatment process including a coagulation step and/or a flocculation step and at least one separation step to reduce amount of dissolved and/or particulate matter in the water stream,
  monitoring hydrophobic conditions in the water stream upstream and/or downstream from said adding the at least one pretreatment chemical, and
  controlling dosing of said at least one pretreatment chemical to the water stream based on at least the monitored hydrophobic conditions.

In an embodiment, said at least one separation step includes one or more of a flotation step, a sedimentation step and a filtration step.

In an embodiment, said controlling comprises controlling said dosing of said at least one pretreatment chemical such that the hydrophobic conditions in the water stream are changed towards or maintained below or at target hydrophobic conditions.

In an embodiment, said monitoring comprises fractioning a sample of the water stream into two or more particle populations according to the particle size and/or particle mass.

In an embodiment, said monitored and/or target hydrophobic conditions comprise one or more of
i) at least certain particle sizes and their hydrophobicity
ii) hydrophobicity of at least certain particle sizes
iii) amount or count of hydrophobic particles of certain size
iv) hydrophobicity distribution of particles
v) a total hydrophobicity of the water stream,
vi) total particle count,
vii) particle count of one or more particle population,
viii) particle size distribution,
ix) hydrophobicity of one or more particle population.

In an embodiment, the method further comprises membrane filtration of the pretreated water stream downstream from the pretreatment process, and wherein said controlling of dosing of said at least one pretreatment chemical is configured to reduce a membrane fouling in the membrane filtration.

In an embodiment, the controlling of dosing of said at least one pretreatment chemical comprises one or more of
i) a feedback-type controlling based on samples taken from the water stream downstream from said adding the at least one pretreatment chemical, preferably after said at least one separating step,
ii) a feed forward-type controlling based on samples taken from the water stream upstream from said adding the at least one pretreatment chemical, and
iii) a feed forward-type controlling for a first one of said at least one pretreatment chemical and a feedback-type control for a second one of said at least one pretreatment chemical.

In an embodiment, monitored and/or targeted hydrophobic conditions comprise
determining the hydrophobicity based on a fluorescence measurement, and
determining amount or count of particles based on an optical measurement, such as light scattering measurement or a turbidity measurement.

In an embodiment,
a sample of the water is separated into two or more particle populations according to the particle size and/or mass,
the sample is stained with a fluorescent dye, preferably Nile red dye before or during fractionation,
a fluorescence intensity data over time is measured for each population of the dyed sample,
the hydrophobicity for each population is calculated from the fluorescence intensity data by integrating a measured fluorescence intensity over time.

In an embodiment the method comprises membrane filtration of the pretreated water stream downstream from the pretreatment process, and controlling or initiating or rescheduling cleaning of the membrane filtration based on the monitored hydrophobic conditions of the water stream, said cleaning preferably comprising dosing at least one chemical cleaning agent.

Another aspect of the invention is a control system implementing the control method according to embodiments of the invention, the control system comprising a dosing unit configured to add at least one pretreatment chemical to the water stream, an online monitoring unit configured to monitor hydrophobic conditions of the water stream, and a control unit configured to control the dosing unit based on hydrophobic conditions data provided from the online monitoring unit.

In an embodiment, the online monitoring unit comprises optical detectors, such as a fluorescence detector and a light scattering detector or a turbidity detector.

In an embodiment, the system further comprises a membrane cleaning system controlled based on hydrophobic conditions data provided from the online monitoring unit.

A further aspect of the invention is use of online hydrophobicity monitoring unit in controlling of a water treatment process.

A further aspect of the invention is use of a method according to according to embodiments of the invention to prevent or decrease fouling in a following water treatment step, such as membrane filtration, or on surfaces in following process(es) using water from the pretreatment process, surfaces such as pipes, heat exchangers, instruments, cooling water systems, or other underwater surfaces and splash areas.

A further aspect of the invention is use of a method according to according to embodiments of the invention to optimise hydrophobic conditions in a following water treatment step, such as membrane filtration, or on the surfaces in following process(es) using water from the pretreatment process, surfaces such as pipes, heat exchangers, instruments, cooling water systems, other underwater surfaces and splash areas.

In embodiments, the process step comprises a process step in pulp and paper industry, food and beverage industry, mining industry or oil industry.

BRIEF DESCRIPTION OF THE DRAWINGS

In the following exemplary embodiments of the invention will be described with reference to the attached drawings, in which.

EXEMPLARY EMBODIMENTS

Embodiments of the invention can be used in controlling water pretreatment before a membrane filtration in a water treatment system.

Embodiments of the invention can be used in controlling water pretreatment also before other water treatment steps.

Embodiments of the invention can be used to prevent or decrease fouling in a following (subsequent) water treatment step, such as membrane filtration.

Embodiments of the invention can be used to optimise hydrophobic conditions in a following (subsequent) water treatment step, such as membrane filtration.

Embodiments of the invention are not restricted to water treatment systems, and fouling in membrane filtration. Embodiments of the invention can be used in controlling water pretreatment also before usage of the pretreated water in any following (subsequent) process wherein fouling may occur.

Embodiments of the invention can be used to prevent or decrease fouling on surfaces in one or more following (subsequent) process step using water from the pre-treatment process. The surfaces on which fouling is prevented or decreased may include, for example, surfaces of pipes, heat exchangers, instruments, cooling water systems, other underwater surfaces and splash areas. The one or more process steps may comprise a process step in pulp and paper industry, food and beverage industry, mining industry or oil industry, for example.

Embodiments of the invention can be used to optimise hydrophobic conditions on the surfaces in one or more following (subsequent) process step using water from the pretreatment process. The surfaces on which hydrophobic conditions are optimized may include, for example, surfaces of pipes, heat exchangers, instruments, cooling water systems, other underwater surfaces and splash areas. The one or more process steps may comprise a process step in pulp and paper industry, food and beverage industry, mining industry or oil industry, for example.

Figure 1:
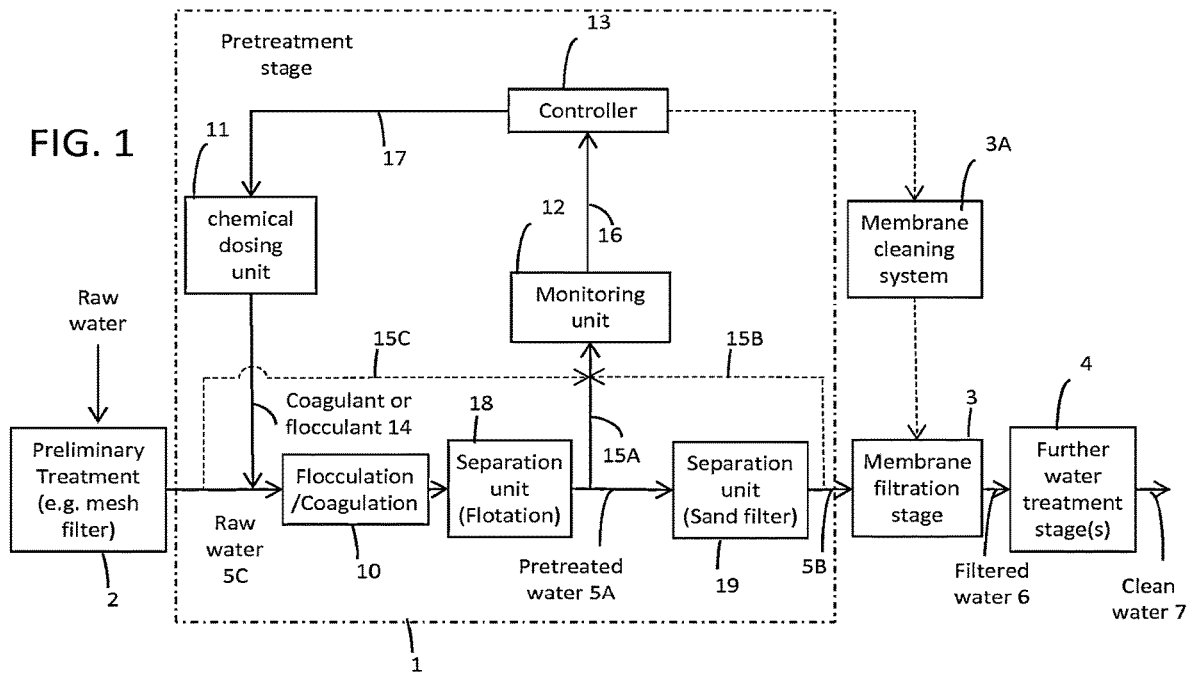
FIG. 1 is a schematic block diagram for an exemplary water treatment system.

An example of a water treatment system is schematically illustrated in FIG. 1. Water: raw water, such as surface water, industrial water, waste water, saline water or brackish water or any other type of feed water, may first be subjected to a preliminary treatment process 2 (any physical, chemical or mechanical process) on water before it undergoes a main treatment process. For example, typically during the preliminary treatment screens or mesh filters may be used to remove rocks, sticks, leaves and other debris, or a pre-sedimentation stage can settle out sand, grit and gravel from raw water.

In a main treatment process, a first step may be a pretreatment process 1 that reduces the amount of dissolved and/or particulate matter in the water stream 5C, e.g. raw water or waste water that may affect the performance of a subsequent membrane filtration stage 3, e.g. fouling formation on membrane surface. The particulate matter may be colloidal particles and/or suspended particles. Dissolved matter and particulate matter may each comprise either organic matter, inorganic matter or both. The membrane filtration 3 may comprise one or more of microfiltration (MF), ultrafiltration (UF), nanofiltration (NF), reverse osmosis (RO), forward osmosis, membrane contactor and membrane distillation. The membranes provide a physical barrier that that permits the passage of materials only up to a certain size, shape or character, and effectively removes solids, viruses, bacteria and other unwanted molecules. Membrane filters are commercially available in a variety of configurations including hollow fiber, spiral, and tubular shapes. It should be appreciated that a specific implementation of the membrane filtration is not relevant for embodiments of the invention. There may be further water treatment stages 4 before or after the membrane filtration 3 before having clean water 7. In an embodiment membrane filtration step 3 is not included in the water treatment process. Still in another embodiment there are no further water treatment steps after the pretreatment process.

In embodiments pretreatment process 1 may be followed, instead of the membrane filtration 3, by any process step having surfaces on which fouling may occur, such as process steps in pulp and paper industry, food and beverage industry, mining industry or oil industry, for example. Same principles as described below in connection with the subsequent membrane filtration 3 are applicable for other types of subsequent process steps or stages too.

The pretreatment 1 ensures efficiency of the subsequent membrane filtration 3. Dissolved and/or particulate matter must be removed and the water pre-treated in order for the fouling not to affect the membranes. Keeping the membrane surface clean from organic and inorganic fouling is critical, because fouling can result in a serious drop in flux, a salt rejection and ultimately a complete shutdown for a time and labour consuming membrane cleaning. A common pretreatment process step for a membrane filtration is coagulation or flocculation 10 or a combination thereof. Coagulation may involve a rapid mixing of the coagulant and the water (e.g. by means of a mixing equipment not shown in FIG. 1), and the coagulation may further be associated with a flocculation process/stage and/or a separation stage 18, such as flotation, sedimentation, filtration. Coagulation and/or flocculation step may also be performed in a pipe. Thus, a coagulation and/or flocculation unit where coagulation and/or flocculation occurs may be e.g. a pipe. Coagulation and/or flocculation may thus be inline coagulation and/or flocculation. In that case unit/step 18 may preferably be excluded; and preferably only one separation unit, often filter, e.g. sand filter, is enough to remove the flocs. During the flocculation stage dense flocks are formed. The separation stage may remove suspended matter, which may comprise one or more of or consist of flocs, organic matter, microorganisms, algae, silt, iron, and manganese precipitates from the raw water. In case of a separation step is a sedimentation step, sludge accumulated at the bottom of a tank or basin may be pumped or scraped out for eventual disposal. The separation may be implemented in one or more stages, such as the separation stages 18 and 19. The last separation stage 19 may be a sand filter or the like, wherein the residual suspended or coagulated materials are filtered out when water passes through beds of granular material, usually composed of layers of sand, gravel, coal, garnet, or related substances. It should be appreciated that a specific implementation of the coagulation or flocculation process and any possibly associated water pretreatment process is not relevant for embodiments of the invention.

The main objective of a coagulation process 10 is to precipitate dissolved compounds and to aggregate small particles to larger ones. Pretreatment chemicals 14, such as coagulants and/or flocculants, are added to the water stream 5C, which may be raw water, e.g. by a pretreatment chemical dosing unit 11 (step 20 in FIG. 2). The pretreatment chemicals 14 cause small particles to clump together (coagulate), and smaller clumps of particles may further form larger groups called "flocs". The separation of the flocs/suspended solids may be carried out by flotation, sedimentation and/or filtration, for example.

Coagulant or flocculant comprises or can be selected from salts or anionic, nonionic and cationic polyelectrolytes of uni- or multivalent cations, such as sodium, calcium, magnesium, iron, aluminum, natural products such as starch, semi-synthetic polymers such as cationic starch and synthetic polymers such as acrylic polymers, polyamines, polyethylene oxides and allylic polymers, or mixtures thereof.

Coagulant is typically an inorganic (anion/cation) or organic (polyelectrolyte) chemical, which neutralizes the negative or positive surface charge (destabilization) of the impurities, such as dissolved substances and colloidal particles.

Flocculation refers e.g. to the action of polymers in forming bridges between suspended particles or working by patch models. A flocculant may promote the formation of the floc. Flocculant may be an inorganic polymer (such as activated silica), a natural polymer (starch, alginate) or synthetic polymers.

However, most often an improper adjustment of pretreatment chemicals, e.g. coagulants, (overdosage or underdosage) and operating conditions reduce the performance of coagulation. In order to reduce the impact of overdosing or underdosing of pretreatment chemicals, e.g. coagulant(s), there is need to have a system to control the dosing of pretreatment chemicals (step 20 in FIG. 2). The water stream with the pretreatment chemicals is the processed in the coagulation stage 10 (step 22 in FIG. 2).

Figure 2:
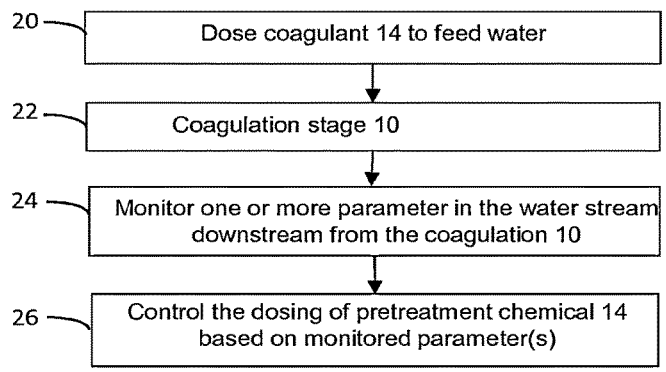
FIG. 2 is a flow diagram illustrating an exemplary operation of a water treatment system of FIG. 1.

In the exemplary pretreatment process 1 illustrated in FIG. 1, a monitoring unit 12 is provided to monitor one or more parameters in the (pretreated) water stream 5A and/or 5B downstream from the flocculation/coagulation 10 (step 24 in FIG. 2). For example, water samples or a sample stream 15A and/or 15B may be taken from the water stream 5A or 5B respectively, and inputted to the monitoring unit 12. In a further exemplary embodiment, water samples or a water sample stream 15C may be taken from the water stream 5C before the pretreatment process 1 or flocculation/coagulation stage 10. In a still further embodiment, a sample may be taken from the water stream after the flocculation/coagulation step 10 and before the following separation step 18. Further, a controller 13 (separate to or integrated with the monitoring unit 12), may control 17 the pretreatment chemical dosing unit 11, more specifically dosage of the pretreatment chemical(s) 14 from the dosing unit 11, based on a monitoring result 16 from the monitoring unit 12 (step 26 in FIG. 2). As discussed above, streaming current detectors (SCD), Zeta (ζ) potential detectors, and pH sensors have been proposed for implementation of a monitoring unit 12 in prior art systems. These approaches have various disadvantages.

Figure 3:
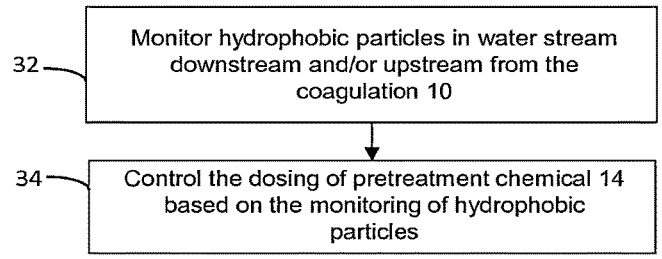
FIG. 3 is a flow diagram illustrating an exemplary control of pretreatment chemicals based on the particle size and particle hydrophobicity in a water treatment system.

In embodiments of the invention, hydrophobic particles in the (pretreated) water stream 5A and/or 5B downstream from and/or in the (raw) water stream 5C upstream from the coagulation 10 (prior to the membrane filtration 3) are monitored (step 32 in FIG. 3) by the monitoring unit 12, and the dosing of the pretreatment chemical(s) 14 is controlled based on at least the monitoring of the hydrophobic particles (step 34 in FIG. 3).

In embodiments of the invention, at least certain particle sizes and their hydrophobicity in the pretreated raw water 5A or 5B downstream and/or in the raw water 5C upstream from the coagulation 10 are monitored by the monitoring unit 12, and the dosing of the pretreatment chemical(s) 14 is controlled based on at least the monitored particle sizes and hydrophobicity.

In embodiments of the invention, count of hydrophobic particles (preferably particles of certain size and hydrophobicity) in the pretreated water 5A or 5B downstream and/or in the raw water 5C upstream from the coagulation 10 (prior to the membrane filtration 3) are monitored by the monitoring unit 12, and the dosing of the pretreatment chemical(s) 14 is controlled based on the count of the hydrophobic particles.

In embodiments of the invention, the dosing of the pretreatment chemical(s) 14 is controlled based on at least the monitoring of the hydrophobic particles in a sense reducing a membrane fouling in the membrane filtration 3.

Compared to prior art control methods, such as those using the streaming current or the zeta potential, a more reliable and accurate pretreatment of feed water is achieved. Also, more reliable and accurate membrane fouling control or other post-treatment of water is achieved. The post-treatment may be e.g. microfiltration (MF), ultrafiltration (UF), nanofiltration (NF), reverse osmosis (RU) or tertiary flotation. Furthermore, more reliable and accurate method to control fouling on surfaces in following process steps utilizing pretreated water is used. Such surfaces comprise pipes, instruments, heat exchangers, cooling water systems, or other underwater surfaces and splash areas. Typically the pretreated water is used in industrial processes, such as pulp and paper making industry, food and beverages industry, and mining industry, oil industry. The information on the hydrophobic particles is more reliable and close to real conditions on water treatment surfaces, e.g. on membrane surfaces or other process equipment surfaces. Most of organic substances and particles (colloidal and suspended solids) have a hydrophobic nature, most of membranes have hydrophobic surfaces, and the hydrophobic-hydrophobic interaction between hydrophobic particles and membrane surface causes membrane fouling. In addition, organic substances and especially hydrophobic particles have a tendency on creating fouling on many types of surfaces.

In embodiments of the invention, the hydrophobicity of the certain particle sizes is determined based on a measured fluorescence of the certain particle sizes.

In embodiments of the invention, the monitoring: comprises monitoring samples taken from the water downstream and/or upstream from the coagulation. The samples may comprise an essentially continuous sample stream or individual samples taken in sequences, e.g. at predetermined intervals. The individual sample may be a batch sample or "plug" of a predetermined size, such as from few millilitres to dozens of millilitres, preferably about 10 millilitres, taken with automated sampling means.

Figure 4:
FIG. 4 illustrates a sample before and after fractionation.

In embodiments of the invention, different particle populations in the water stream are distinguished or separated from each other. For example, the suspended material in the pretreated raw water may be separated or fractionated into two or more "fractions" according to the mass and/or size of the particles. For example, a fractionation may be performed by varying the water flow rate from a pump upstream of the sample to be fractionated, with the lightest particles coming out first, and the heaviest particles coming out last. An example of performing the fractionation is in accordance with the method described in WO 2013/175007 A1. As an example, FIG. 4 illustrates a sample before and after fractionation. The unfractioned sample 41 contains a mix of particles of different sizes. Heavier particles have a tendency to sink, as shown by the arrows pointing downwards in 41. In a flow fractioned sample 42, the particles are divided into (at least) three particle populations F1, F2 and F3, the lightest particles F1 being first and the heaviest particles F3 being last in the sample. Thus, the different particle populations F1, F2 and F3 are exiting of the fractionator at different times, and the populations are therefore separated in time. The time needed to exit the fractionator may be referred to as a retention time of the population. It can be seen that there is both a horizontal and vertical separation of the particle populations, the vertical difference being due to the difference in weight of the particles.

In embodiments of the invention, the sample containing particles may be mixed with a fluorescent dye, also called a fluorescent probe. This special type of dye is absorbed by hydrobic substances only. This process is often referred to as a staining of a sample. The staining of the sample or particles of the sample may be done before or during the fractionation, or after the fractionation, before measurement(s). The fluorescent is added in a predetermined quantity to the sample. The amount of stain may be, for example, around 10 to 100 microliters, preferably around 40 microliters per 1 millilitre of sample. A very suitable fluorescent dye that can be used is Nile red.

Figure 5:
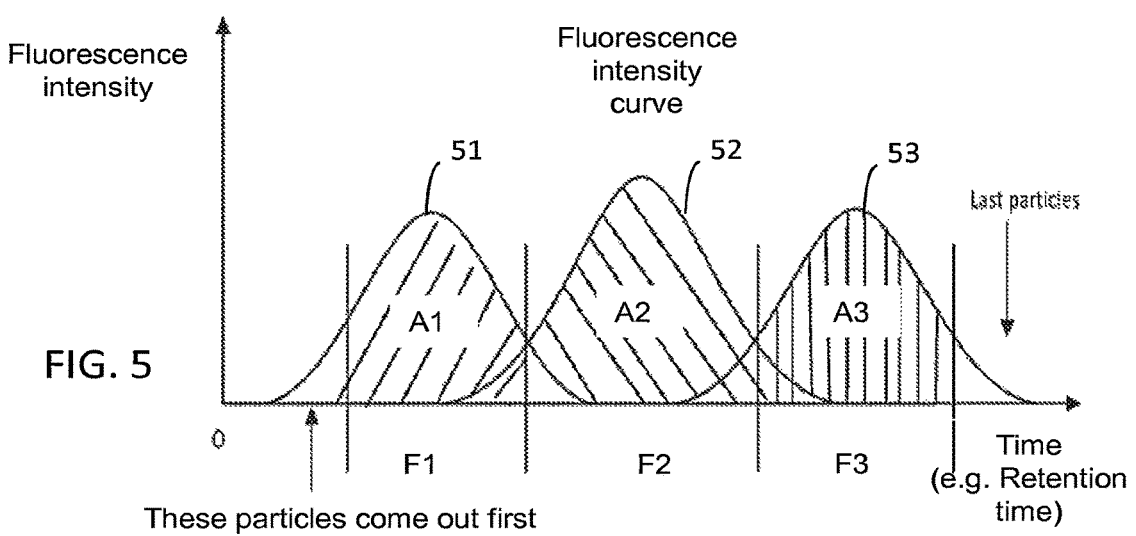
FIG. 5 shows an illustrative fluorescence data of three fractions F1, F2 and F3.

In embodiments of the invention, fluorescence intensity data over time is measured and recorded for a sample that is separated or fractioned into two or more particle populations or fractions for measurement purposes before monitoring step. The measured fluorescence data can be presented as a fluorescence intensity curve. Fluorescence data is used for the calculation of the hydrophobicity. The fluorescence intensity correlates directly with hydrophobicity of the sample fractions when a hydrophobic dye, such as Nile red is added to the sample. The hydrophobicity can be determined as an integrated area under the fluorescence intensity curve. The hydrophobicity data for each particle fraction or particle population of the sample can be determined as an integrated area under the portion of the fluorescence intensity curve that corresponds to the specific particle fraction or population in time. An illustrative fluorescence data of three fractions F1, F2 and F3 (such as those shown in FIG. 4) is shown in FIG. 5, where an integrated area A1, A2 and A3 under a fluorescence curve 51, 52 and 53 of each fraction F1, F2 and F3 represents the hydrophobicity for the respective fraction F1, F2 and F3. The hydrophobicity of each fraction depends upon, inter alia, the number of hydrophobic particles, the level of hydrophobicity of the respective particles (the number of hydrophobic moieties in the particle), and the particle size of the respective particles.

In embodiments of the invention, a number of particles of the certain particle sizes are determined based on light scattering measurement or a turbidity measurement. Turbidity data may be used to determine the relative number of particles in each fraction. The turbidity (measured via a light scattering technique) of each fraction may depend upon, inter alia, the number of particles, the size of the respective particles, the shape of the respective particles, and the colour or reflectivity of the respective particles.

Figure 6:
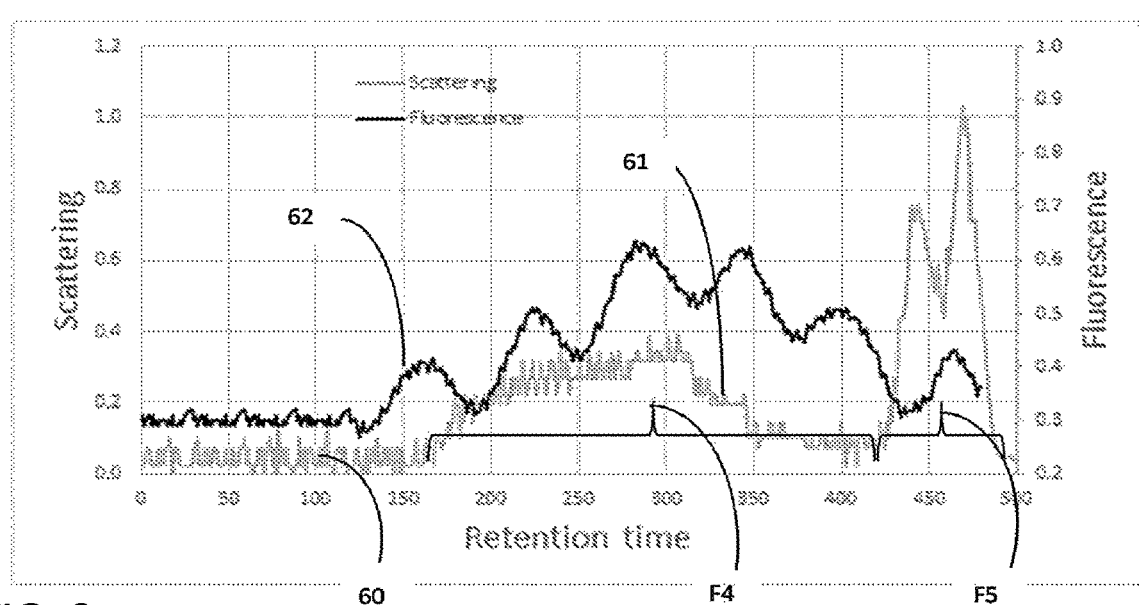
FIG. 6 shows an example of the scattering signal and the fluorescence data.

FIG. 6 shows an example of the scattering signal 61 and fluorescence data 62 that a monitoring unit may provide for a sample fractioned into two particle populations or fractions F4 and F5. In the example, small particles, such as colloids in the fraction F4 exit from a separating stage (such as a fractionator) first, followed by heavier particles like agglomerates in the particle fraction F5 which exit last (the longest retention time). As can be seen, the scattering 61 first increases from the baseline 60 for the fraction F4 with the small size particles, while higher scattering is obtained for the fraction F5 with the large particles and high particle concentration. The fluorescence 62 starts to increase slightly earlier than light scattering. Fluorescence value of F4 fraction is higher than for the F5 fraction, which means that the larger particles are less hydrophobic.

In embodiments of the invention, one or more of at least the following key variables can be derived from the data provided:

count(s) of particles: total count and count of each particle population from the turbidity signal;

size(s) of particles from the retention time of each particle populations in the system, i.e. the time when particles are exiting the fractionator;

particle size distribution from turbidity and retention time(s);

hydrophobicity of particles: total hydrophobicity and hydrophobicity of each particle population from the fluorescence signal;

hydrophobicity distribution of particles from fluorescence signal and retention time(s).

In embodiment of the invention, a signal processing and calculation of key variables for the particle properties may include one or more of filtering, averaging, derivation and baseline correction of the signals, or any other basic mathematical operations and/or the use of applicable functions to modify the measurement signals. A baseline may be removed from the raw signals of a fractionated sample, and the cumulative sums may be calculated from signals. The cumulative sum of turbidity signal may correlate with the count of particles, and the cumulative sum of fluorescence signal may be correlated with the hydrophobicity of the particles. Hydrophobicity and count for each particle population may be derived from signals at certain time intervals. Total hydrophobicity and total count may be derived from the whole signal of fractionated samples. The turbidity, particle size and number in a sample population may be determined by measuring absolute values or relative values. If absolute values are determined, the processing means for processing the measurement signal for each particle population may be calibrated with regard to known samples.

Example 1

Figure 7A:
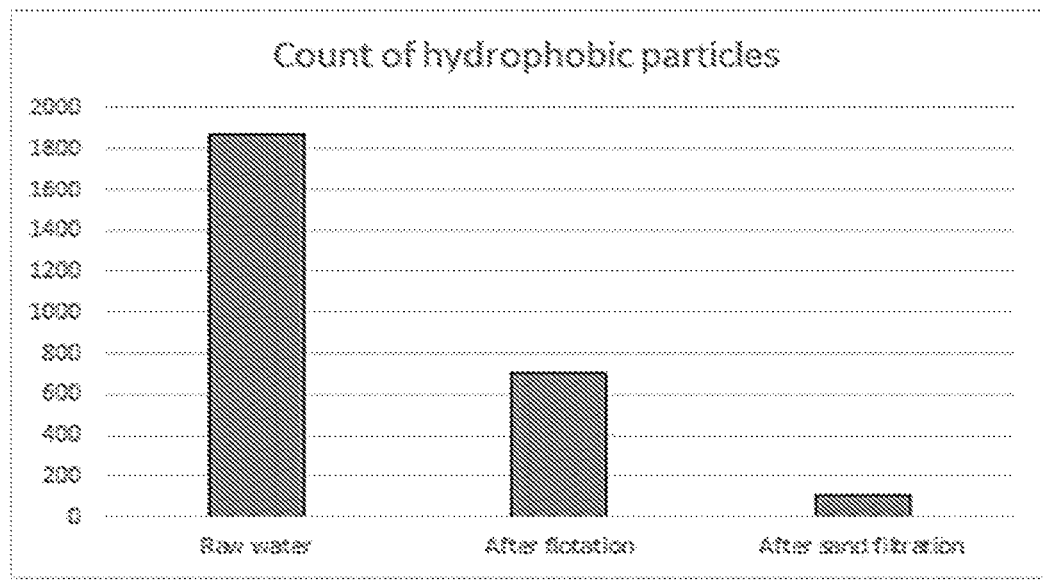
FIGS. 7A and 7B are bar graphs illustrating count of hydrophobic particles and size of hydrophobic particles in the samples, respectively, at different measurement points in an operating water treatment process.
Figure 7B:
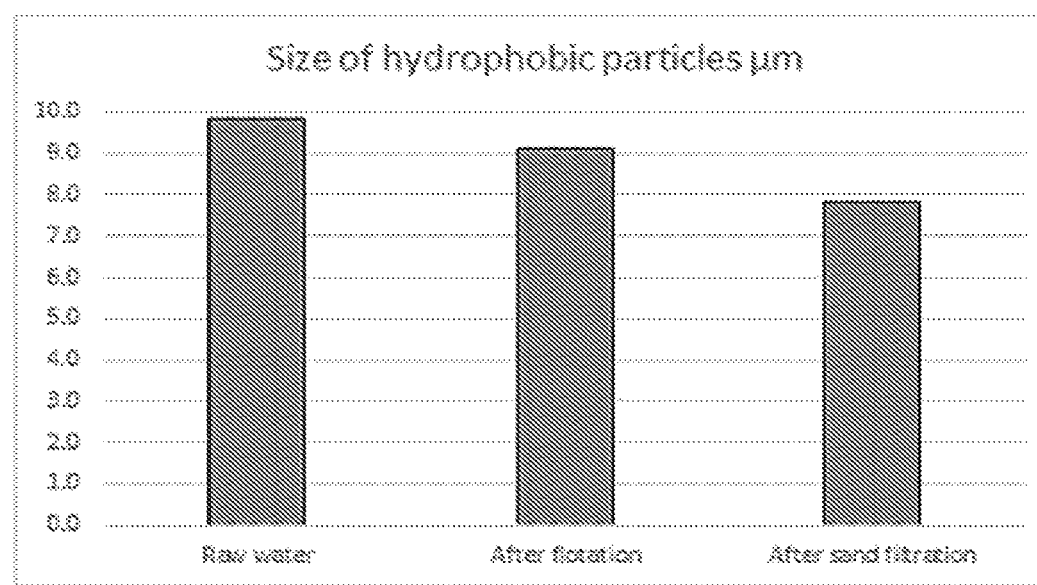

FIGS. 7A and 7B are bar graphs illustrating count of hydrophobic particles and size of hydrophobic particles in the samples, respectively, at different measurement points in an operating water treatment process. In the water treatment process from which the samples were taken, the first separation stage 18 includes a flotation tank, and the second separation stage 19 includes a sand filter. From the sand filter the water is fed to the membrane filtration stage 3 which includes a reverse osmosis (RO) stage. Hydrophobic particles of certain size were measured in the process by optical sensors (fluorescence and scattering). The analysis was made offline in laboratory with samples taken from the specific points of the water treatment process. From FIGS. 7A and 7B it can be seen that, in the analysed water treatment process, the number of the measured hydrophobic particles was reduced by 62% after flotation and by 92% after sand filtration in relation to the raw water. Thus, it is evident that the water pretreatment process has an influence on the amount and nature of the hydrophobic particles, and that this could be used as quality control parameter to adjust dosing of coagulants and/or flocculants or other chemicals, preferably coagulants and/or flocculants in water pretreatment processes. The amount and nature of the hydrophobic particles could also be used as quality control parameter to adjust dosing of coagulants and/or flocculants so that fouling in the following water treatment steps, e.g. on membrane filters or fouling on the surfaces in the usage of the pretreated water in following processes is prevented, decreased or otherwise kept under control.

Example 2

Figure 7C:
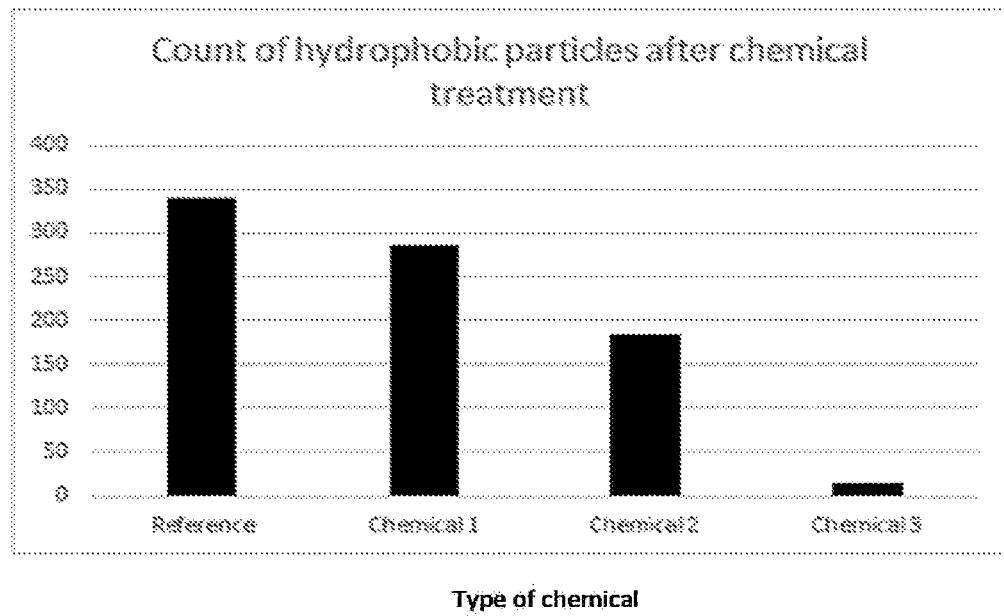
FIGS. 7C and 7D illustrate variation of count of hydrophobic particles for one surface water and several different surface waters, respectively, with different pretreatment chemicals.
Figure 7D:
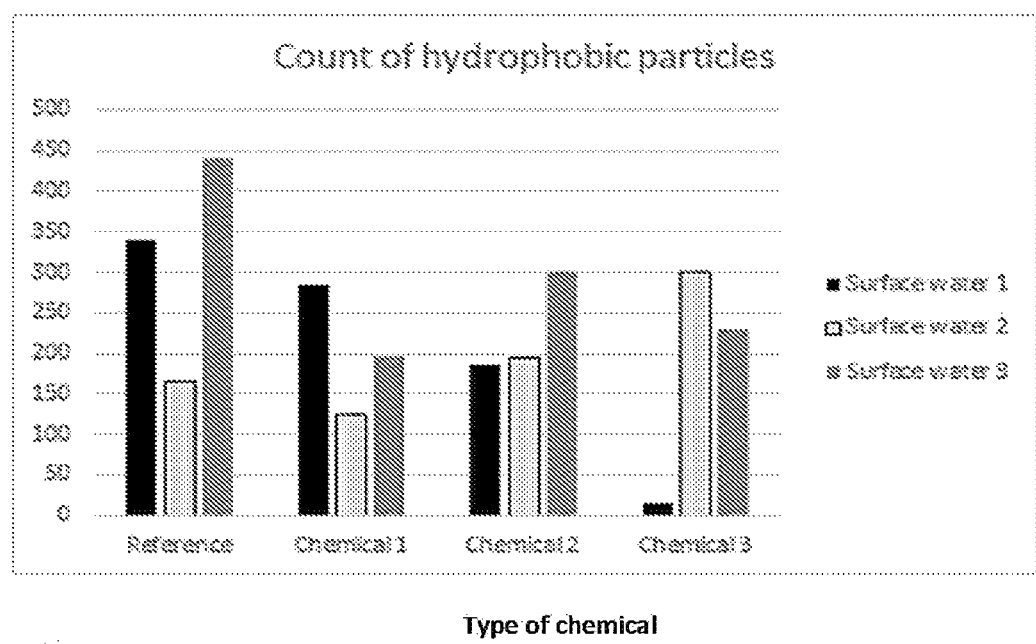

In the target of this study was to evaluate the performance of online water quality monitoring device for surface waters, when the device was able to measure particle amount and hydrophobicity on-line. Three different types of surface water 1, 2 and 3 having different total organic carbon (TOG) concentration were used in this study. Further, three pretreatment chemicals (coagulants) 1, 2 and 3 were used. Firstly, a reference sample of each of surface waters 1, 2 and 3 was analysed before dosing a pretreatment chemical. FIG. 7C illustrates count of hydrophobic particles in the sample for the surface water 1 with the different pretreatment chemicals 1, 2 and 3 after the chemical pretreatment (from the pretreated water 5A after the flotation). The results show that the online monitoring device was able to detect changes in water quality (compared with the reference sample) and between water samples receiving different treatments (with different chemicals). It can also be seen that the type of chemical has a significant influence on how well the hydrophobic particles are removed from the surface water. The lower the bar, the better is the removal of hydrophobic particles by the respective chemical. Similarly, FIG. 7D illustrates count of hydrophobic particles for all surface waters 1, 2 3 with the different pretreatment chemicals 1, 2 and 3. It can be seen that the type of surface water has a significant influence of the selection of the pretreatment chemical. For example, the chemical 3 removes hydrophobic particles well from the surface water 1 but it is less suitable for the surface waters 2 and 3.

In embodiments of the invention, the dosing of the pretreatment chemical(s), such as coagulant and/or flocculant, is controlled such that the hydrophobic conditions in the pretreated water are brought towards target hydrophobic conditions.

In embodiments of the invention, the dosing of the pretreatment chemical(s), such as coagulant and/or flocculant, is controlled so that amount or count of hydrophobic particles of a certain size ( ) is decreased or maintained below or at a predetermined target value. In embodiments of the invention, the dosing of the pretreatment chemical(s), such as coagulant and/or flocculant, is controlled so that total hydrophobicity of particles after the chemical pretreatment is decreased or maintained below or at a predetermined target value.

In embodiments of the invention, the dosing of the pretreatment chemical(s), such as coagulant and/or flocculant, is controlled so that count of hydrophobic particles after the chemical pretreatment is decreased.

In embodiments of the invention, the closing of the pretreatment chemical(s), such as coagulant and/or flocculant, is controlled so that count of hydrophobic particle decreases and thereby the risk of membrane fouling is decreased.

Controlling may be performed manually or preferably automatically.

Figure 8:
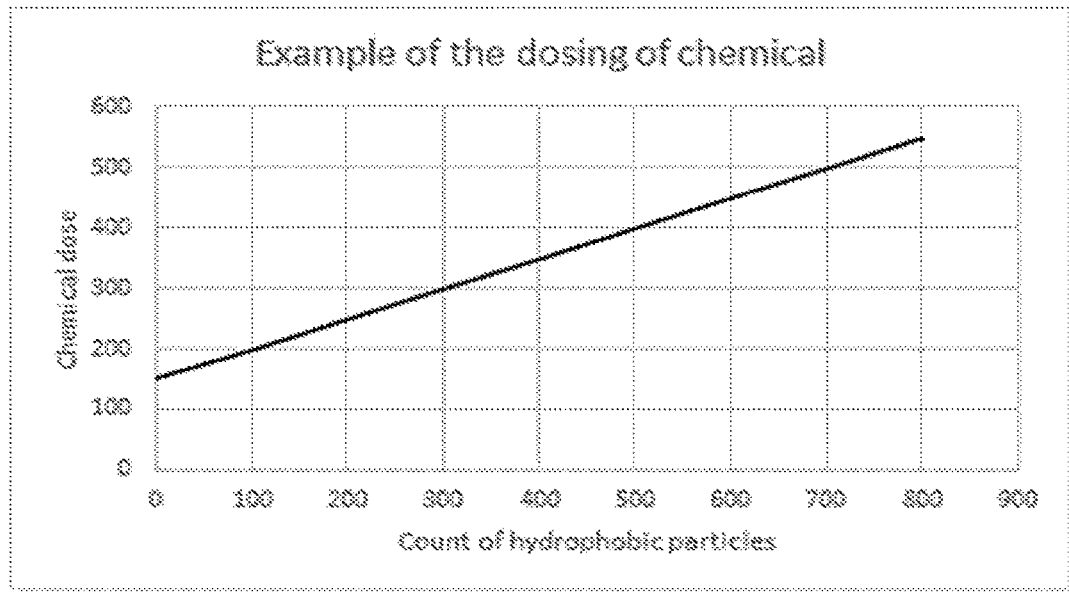
FIG. 8 illustrates an example of dosing of a pretreatment chemical (milligrams per 1 liter of water) as a function of the count of hydrophobic particles.

In embodiments of the invention, a control of the dosing of the pretreatment chemical(s), such as coagulant and flocculant, may be based on any control algorithm that outputs a chemical dose value according to the monitored characteristic, such as a count, of the hydrophobic particles measured. An example of dosing of a pretreatment chemical (milligrams per 1 litter of water) in function of the count of hydrophobic particles is illustrated in FIG. 8.

In embodiments of the invention, a dosing controller may be a proportional integral (PI) type controller.

In embodiments of the invention, a feedback control type dosing control may be used wherein the dosing of chemical is controlled based on samples taken from the water after the chemical treatment (e.g. sample 15A or 15B in FIG. 1).

In embodiments of the invention, a feedforward control type dosing control may be used wherein the dosing of chemical is controlled based on samples taken from the incoming raw water stream 15C before coagulation and before or after chemical addition (e.g. sample 15C in FIG. 1). A feedforward control enables fast proactive response to big changes in the quality of the incoming water: the chemical dosing can be immediately adapted to the change.

In embodiments of the invention, both a feedforward type dosing control and a feedback type dosing control may be used.

In embodiments of the invention, a feedforward type dosing control may be used for one chemical (e.g. coagulant) and a feedback type dosing control may be used for another chemical (e.g. flocculant).

In embodiments of the invention, two or more chemicals may be added. In embodiments of the invention, chemical type may be changed according to the measuring results.

According to an aspect of the invention, cleaning of a membrane filter unit may be controlled or initiated or rescheduled based on measured hydrophobic conditions. In embodiments of the invention, the cleaning of a membrane filter unit may be initiated or rescheduled based on short-term or long-term measured hydrophobic conditions. For example, the cleaning may be controlled or initiated or rescheduled if the short term or long-term measurement exceeds a threshold level. A mechanical cleaning or a chemical cleaning of membrane, or both, may be used. Chemical cleaning agents may be used that remove deposits and restore the normal capacity and separation characteristics of membrane. In an exemplary embodiment illustrated in FIG. 1, the controller 13 may be connected to a membrane cleaning system 3A of the membrane filtration stage. In an embodiment, a report or an alarm may be provided to an operator of the water treatment process about a need for controlling or initiating or rescheduling a membrane cleaning. In an embodiment, the controlling of the chemical cleaning may comprise controlling dosing of the cleaning agent(s).

According to an aspect of the invention, the performance of the membrane filter unit may be controlled based on measured hydrophobic conditions. Performance of a membrane may be described by rejection, e.g. salt rejection, permeate flux and/or pressure difference. Higher rejection, the higher permeate flux, and the lower pressure difference over the membrane are examples of indications of better performance of a membrane filter.

Figure 9:
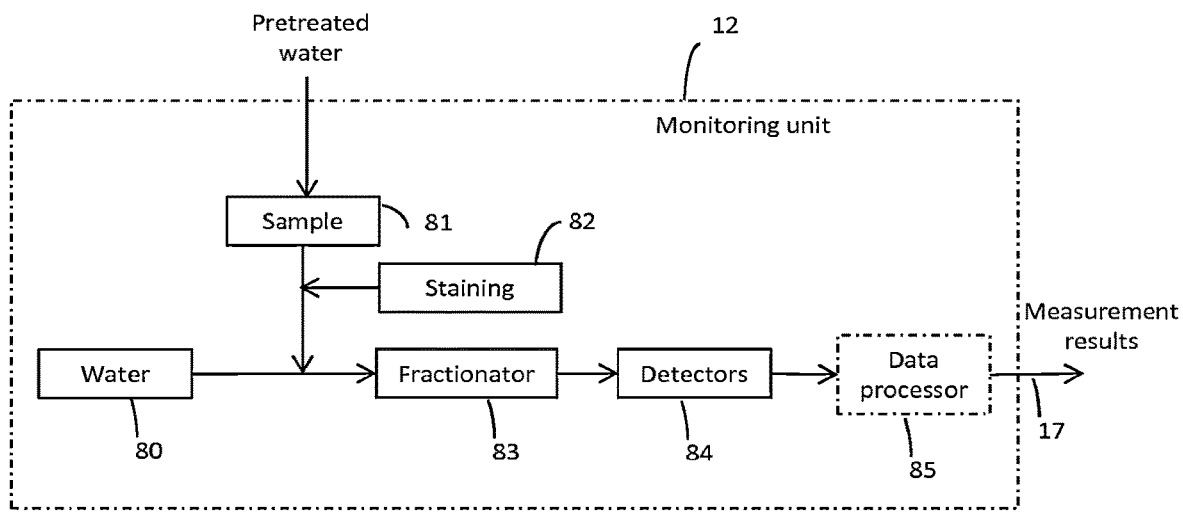
FIG. 9 is a schematic block diagram for a monitoring unit according to an exemplary embodiment.

In FIG. 9 a monitoring unit 12 according to an exemplary embodiment is schematically shown. The monitoring unit may be considered to have two main parts: a preparation part and a measurement part. The preparation part may carry out sampling, dyeing of the sample and separating the sample into particle populations. The preparation part may comprise a sample-taking device 81 that may be arranged to take, e.g. from a side flow 15 of the pretreated water, an essentially continuous sample stream or individual samples (such as a batch sample or "plug") of a predetermined size taken in sequences, e.g. at predetermined intervals. A staining unit 82 with a dye reservoir (not shown) may be provided to feed the appropriate amount of dye to the sample before fractioning the particles into populations. A source of clean water 80 and a pump (not shown) may be provided for driving the sample or water forward through the fractionator in the system using suitable valves (not shown). The prepared sample from the preparation part (e.g. the fractionator) may be measured with one or more detectors 84, such as a fluorescence detector and a light scattering or a turbidity detector. The measurement part of the monitoring unit may also include a data processing unit to carry out the processing of the measurement signals, e.g. to extract the key variables, to provide the measurement results 17. Alternatively, data processing 85 may be provided in a separate computing entity or computer, e.g. in the process controller 13 of the pretreatment stage 1. Such computing entity may be, for example, a programmable logic (PLC) or industrial computer for automatic operation of the system and data collection.

It is to be understood that the embodiments of the invention disclosed are not limited to the particular structures, process steps, or materials disclosed herein, but are extended to equivalents thereof as would be recognized by those ordinarily skilled in the relevant arts.

It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention. Well-known structures, materials, or operations are not shown or described in detail to avoid obscuring aspects of the invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of controlling a water treatment process, the method comprising:
adding at least one pretreatment chemical to a water stream in a pretreatment process including a coagulation step and/or a flocculation step and at least one separation step to reduce an amount of dissolved and/or particulate matter in the water stream,
monitoring hydrophobic conditions in the water stream upstream and/or downstream from said adding the at least one pretreatment chemical,
wherein dosing of said at least one pretreatment chemical to the water stream is based on the monitored hydrophobic conditions, and
controlling a membrane cleaning system of a membrane filtration stage following the pretreatment process based on the monitored hydrophobic conditions.

2. A method as claimed in claim 1, wherein dosing of said at least one pretreatment chemical to the water stream is such that the hydrophobic conditions in the pretreated water are brought towards target hydrophobic conditions.

3. A method as claim in claim 2, wherein monitored and target hydrophobic conditions in the water stream are determined by determining hydrophobicity based on a fluorescence measurement.

4. A method as claimed in claim 3, wherein hydrophobicity is determined by determining the amount or count of particles based on a light scattering measurement.

5. A method as claimed in claim 1, wherein said at least one separation step comprises one or more of: a flotation step, a sedimentation step and a filtration step.

6. A method as claimed in claim 1, wherein said controlling comprising: dosing of said at least one pretreatment chemical such that the hydrophobic conditions in the water stream are changed towards or maintained below or at target hydrophobic conditions.

7. A method as claimed in claim 1, wherein said monitoring comprises: fractioning a sample of the water stream into two or more particle populations according to the particle size and/or particle mass.

8. A method as claimed in claim 1, wherein at least one of the monitored and target hydrophobic conditions comprise one or more of:
 i) at least certain particle sizes and their hydrophobicity
 ii) hydrophobicity of at least certain particle sizes
 iii) amount or count of hydrophobic particles of certain size
 iv) hydrophobicity distribution of particles
 v) a total hydrophobicity of the water stream,
 vi) total particle count,
 vii) particle count of one or more particle population,
 viii) particle size distribution, or
 ix) hydrophobicity of one or more particle population.

9. A method as claimed in claim 1, further comprising:
membrane filtration of the water stream downstream from the pretreatment process, and wherein said controlling dosing of said at least one pretreatment chemical is configured to reduce a membrane fouling in the membrane filtration.

10. A method as claimed in claim 1, wherein dosing of said at least one pretreatment chemical is further based on one or more of:
 i) a feedback-type controlling based on samples taken from the water stream downstream from said adding the at least one pretreatment chemical, preferably after said at least one separating step,
 ii) a feed forward-type controlling based on samples taken from the water stream upstream from said adding the at least one pretreatment chemical, and
 iii) a feed forward-type controlling for a first one of said at least one pretreatment chemical and a feedback-type control for a second one of said at least one pretreatment chemical.

11. A method as claimed in claim 1, wherein monitored and/or targeted hydrophobic conditions comprise:
   determining the hydrophobicity based on a fluorescence measurement, and
   determining amount or count of particles based on an optical measurement, such as light scattering measurement or a turbidity measurement.

12. A method as claimed in claim 1, wherein
   a sample of the water is separated into two or more particle populations according to the particle size and/or mass,
   the sample is stained with a fluorescent dye, preferably Nile red dye before or during fractionation,
   a fluorescence intensity data over time is measured for each population of the dyed sample,
   the hydrophobicity for each population is calculated from the fluorescence intensity data by integrating a measured fluorescence intensity over time.

13. A method as claimed in claim 1, wherein controlling the membrane cleaning system comprises at least one of: initiating or rescheduling cleaning of the membrane filtration based on the monitored hydrophobic conditions of the water stream.

14. A method as claimed in claim 13, wherein said cleaning comprises dosing at least one chemical cleaning agent.

15. A method as claimed in claim 1, further comprising performing membrane filtration of the water stream downstream from the pretreatment process.

16. A method as claimed in claim 1, wherein a process controller of the pretreatment process is connected to the membrane cleaning system, the process controller being configured to control the membrane cleaning system.

17. The method of claim 1, wherein the water treatment process is part of a process in pulp and paper industry.

18. The method of claim 1, wherein the water treatment process is part of a process in food and beverage industry, mining industry or oil industry.

19. A control system configured to perform the method of claim 1.

20. The control system of claim 19, wherein the control system comprises a dosing unit configured to add at least one pretreatment chemical to the water stream, an online monitoring unit configured to monitor hydrophobic conditions of the water stream, and a control unit configured to control the dosing unit based on hydrophobic conditions data provided from the online monitoring unit.

21. The control system of claim 20, wherein the online monitoring unit comprises optical detectors.

22. The control system of claim 20, wherein said controlling of the membrane cleaning system is based on hydrophobic conditions data provided from the online monitoring unit.

* * * * *